United States Patent [19]
Farr

[11] 4,090,740
[45] May 23, 1978

[54] LOAD SENSITIVE BRAKE CONTROL VALVE ASSEMBLIES

[75] Inventor: Glyn Phillip Reginald Farr, Tyseley, England

[73] Assignee: Girling Limited, Birmingham, England

[21] Appl. No.: 767,328

[22] Filed: Feb. 10, 1977

[30] Foreign Application Priority Data

Feb. 11, 1976 United Kingdom ................ 5482/76

[51] Int. Cl.² ............................ B60T 8/18; B60T 8/26
[52] U.S. Cl. .................................. 303/22 R; 188/195; 188/349; 303/6 C
[58] Field of Search ..................... 303/6 C, 6 R, 22 R, 303/22 A, 23, 84 A, 84 R; 188/195, 349; 308/202

[56] References Cited
U.S. PATENT DOCUMENTS

| | | | |
|---|---|---|---|
| 3,329,471 | 7/1967 | Oberthur | 303/22 R |
| 3,512,845 | 5/1970 | Farmery et al. | 188/195 X |
| 3,709,568 | 1/1973 | Miyake et al. | 303/22 R |

Primary Examiner—Trygve M. Blix
Assistant Examiner—Douglas C. Butler
Attorney, Agent, or Firm—Scrivener, Parker, Scrivener and Clarke

[57] ABSTRACT

A control valve assembly for a vehicle braking system comprises a control valve having a control valve operating member operable to control communication between an inlet and an outlet, a pivoted lever arrangement subjected to an input force applied by a spring and applying an output force to the valve operating member, and a device for varying the lever ratio of lever arrangement in dependence upon vehicle loading. The input force applied to the lever arrangement by the spring is substantially constant and independent of vehicle loading, variations in the lever ratio varying the load transmitted to the valve operating member.

13 Claims, 5 Drawing Figures

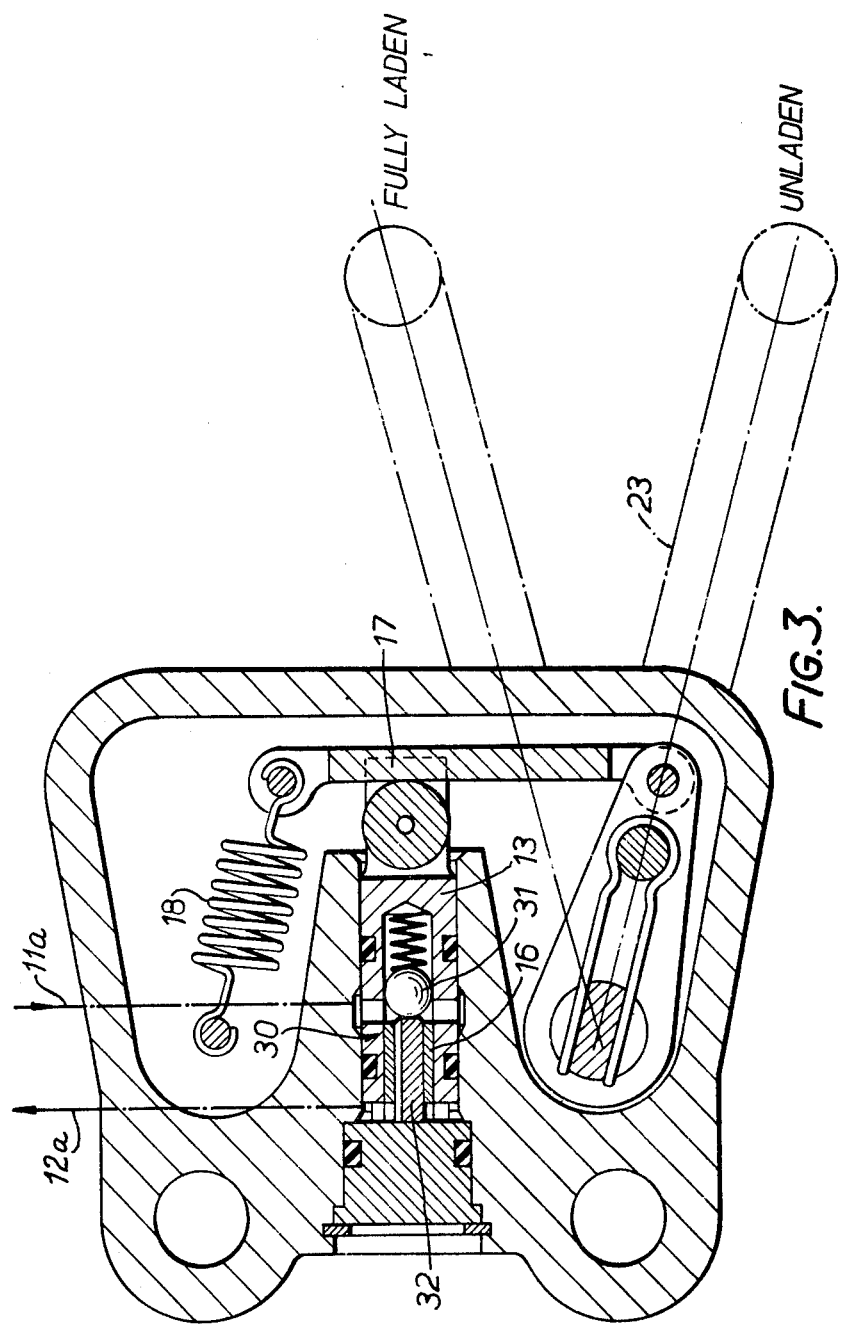

LOAD SENSITIVE BRAKE CONTROL VALVE ASSEMBLIES

This invention relates to control valve assemblies for use in vehicle braking systems.

Control valves are usually positioned in the brake pressure line between the master cylinder and the rear wheel brakes to reduce or limit the pressure applied to the rear brakes relative to the full pressure applied to the front brakes. The valve may have a valve member which is subjected to a pre-load dependence upon vehicle loading so that the "cut-in" point of the valve, i.e. the inlet pressure at which the valve operates, is varied in dependence upon the vehicle loading.

In a previously proposed control valve assembly the pre-load is applied by a torsion spring having one end acting on the valve member and the other end connected to the rear axle. The spring is subjected to vehicle deflections and has a spring rate determined by the pre-loads required to operate the control valve in both the laden and unladen cases. In certain conditions the brakes may be applied when the vehicle suspension is bottomed (at full bump deflection) and with the previously proposed valve this would result in extremely high loads being applied to the control valve member due to the high spring rate.

In accordance with the invention, there is provided a control valve assembly for a vehicle braking system, comprising a control valve having a control valve operating member operable to control communication between an inlet and an outlet, and loading means for applying a load to the valve operating member, said loading means comprising a pivoted lever arrangement subjected to an input force and co-operating with said valve operating member, and means for varying the lever ratio of said lever arrangement in dependence upon vehicle loading, wherein the input force is applied to the lever arrangement by a resilient means and is substantially constant and independent of vehicle loading, variations in the lever ratio varying the load transmitted to the valve operating member.

Preferably, the resilient means is in the form of a coil spring, the length of which remains substantially constant irrespective of the loading of the vehicle and irrespective of the lever ratio, so that the spring force remains substantially constant.

In preferred embodiments of the invention described in more detail below, the lever arrangement comprises a lever pivotable on a fulcrum. In one embodiment the lever moves rectilinearly relative to a fixed fulcrum in dependence upon vehicle loading to vary the lever ratio, the fulcrum preferably being connected to the valve member. In another embodiment the fulcrum moves relative to a fixed lever in dependence upon vehicle loading to vary the lever ratio.

Three forms of control valve assembly in accordance with the invention for a vehicle braking system will now be described, by way of example, with reference to the accompanying drawings, in which:

FIG. 3 is a view similar to that of FIG. 1, but of another form of valve assembly.

Figure 1:
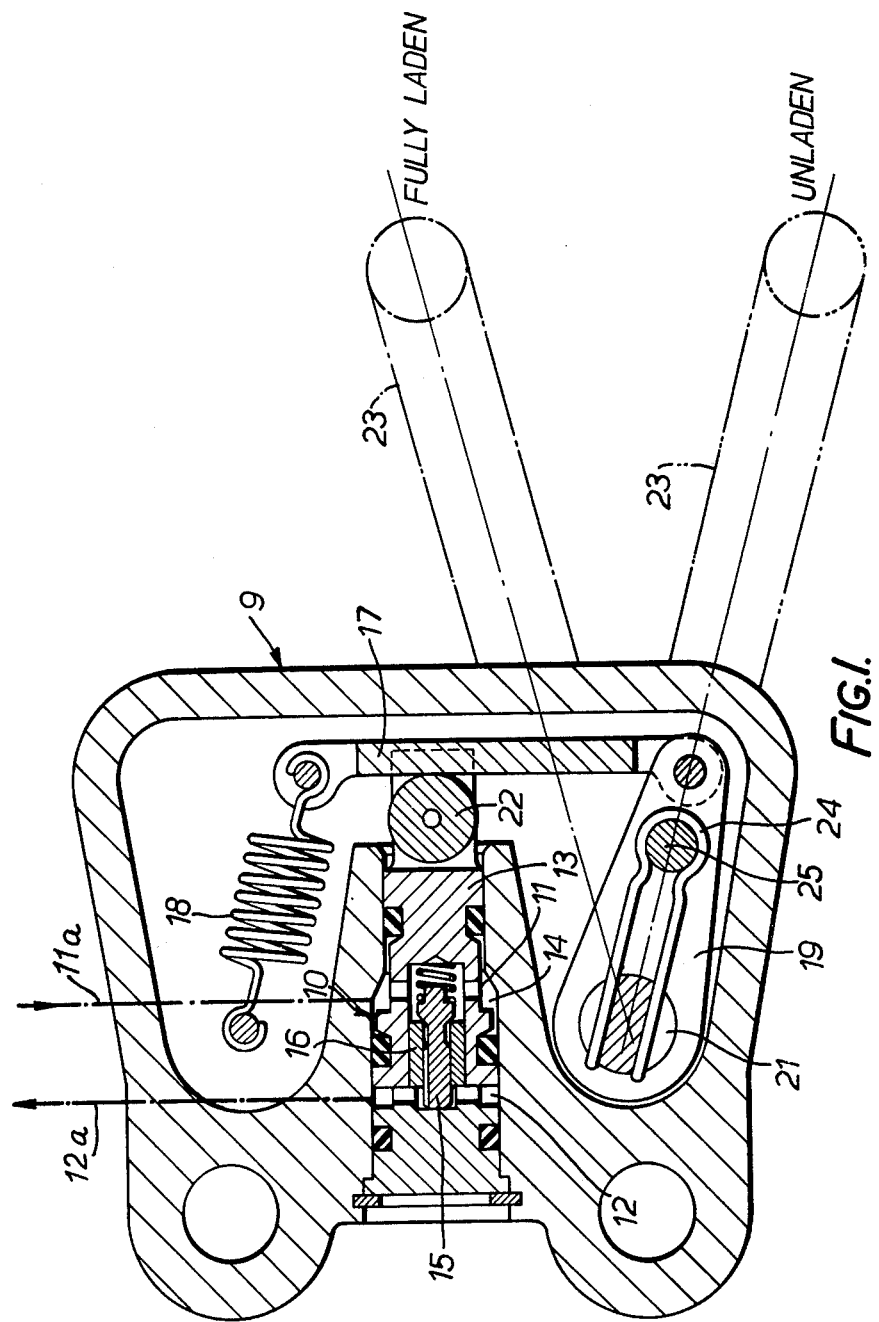
FIG. 1 is a cross-sectional view of one form of control valve assembly.
Figure 2:
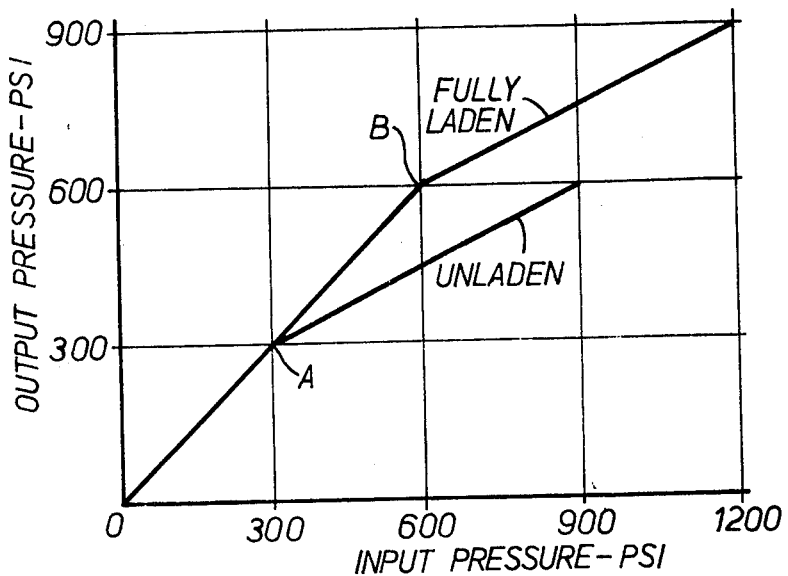
FIG. 2 is a curve of inlet pressure vs. outlet pressure for the valve assembly of FIG. 1.

Referring to FIGS. 1 and 2 the control valve assembly comprising a housing 9 which houses a normally-open valve 10 controlling flow of pressure fluid between an inlet chamber 11 and an outlet chamber 12 which are connected to respective inlet and outlet ports schematically represented by the lines 11a and 12a, respectively. The valve 10 comprises a stepped control piston 13 which is axially sealingly slidable in a correspondingly stepped bore 14. The control piston 13 has an axial counterbore which receives a resiliently biased valve member 15 engageable with a valve seat 16 fixed to and movable with the control piston 13.

In use the valve is connected in a brake line with its inlet connected to a source of fluid pressure, for example a master cylinder, and its outlet connected to one or more brake cylinders, usually the rear wheel brake cylinders. In this way the pressure supplied to the rear wheel brake cylinders is metered as compared to the full pressure which is applied to the front wheel brake cylinders.

The control piston 13 is subjected to a pre-load in dependence upon vehicle loading by a lever arrangement comprising a lever 17 connected at one end to a coil tension spring 18 anchored to the valve housing 9 and pivotally connected at its other end to a rotary link 19 pivotable on a pin 21. The lever 17 is held by the spring 18 in contact with a roller 22 rotatably mounted on the outer end of control piston 13. The pin 21 is rigidly attached to an arm 23 which is movable in dependence upon vehicle loading, movement of the arm 23 being transmitted through a horseshoe spring clip 24 to rotate the link 19 and thereby move the lever 17 laterally relative to the control piston 13 so that the force applied to the control piston 13 by the sprung 18 is altered. In use the housing 9 is mounted on the sprung part of the vehicle and the arm 23 is connected to the unsprung part of the vehicle, for example the rear axle.

The spring clip 24 has its free ends engaging a recessed portion of the pin 21 and its closed end mounted on a spigot 25 on the link 19 so that transient movements of the arm 23 are absorbed by the clip 24.

The valve assembly is illustrated in its condition when the vehicle is unladen, i.e. with the arm 23 in its lowermost position, and an axial pre-load is applied to the control piston 13, which is dependent upon the rate of spring 18 and the lever ratio of lever 17. When the brakes are applied the control piston 13 will move to the right to close the valve 10 when the inlet pressure reaches a "cut-in" value A (see FIG. 2) dependent upon the differential areas of the control piston 13 and the pre-load on the control piston 13. Thereafter, the valve successively opens and closes to increase the outlet pressure at a reduced rate as compared to the inlet pressure. When the inlet pressure is reduced, the control piston 13 moves to the right against the action of spring 18 and the outlet chamber 12 is thus expanded to decrease the outlet pressure. When the inlet and outlet pressure forces and the pre-load are equalised the valve 10 opens and the control piston 13 moves to the left to its illustrated position. Preferably, the expansion of the outlet chamber 12 is so arranged that the relationship between outlet and inlet pressure during brake release is substantially the same as during brake application.

If the vehicle is laden the arm 23 moves upwardly as seen in FIG. 1 and through the intermediary of the link 19 moves the lever 17 to change the lever ratio so that a greater pre-load is applied to the control piston 13. The "cut-in" pressure of the valve 10 is thereby increased to the value B (see FIG. 2).

The expansion movement of the control piston 13 may, for example, be of the order of 0.1 inches and is limited by a stop which may conveniently be part of the housing 1 engageable by the lever 17. The stop may, of course, be provided by the step in the bore engageable by control piston 13.

The form of valve assembly illustrated in FIG. 3 is generally similar to that of FIG. 1, and corresponding parts have been given the same reference numerals. The only difference is that the pressure reducing limiting valve 10 of FIG. 1 is replaced by a pressure valve 30. The valve 30 comprises a spring-loaded ball 31 located within the control piston 13 and normally held out of engagement with the valve seat 16 by engagement with a fluted member 32 extending through the valve seat 16.

Figure 4:
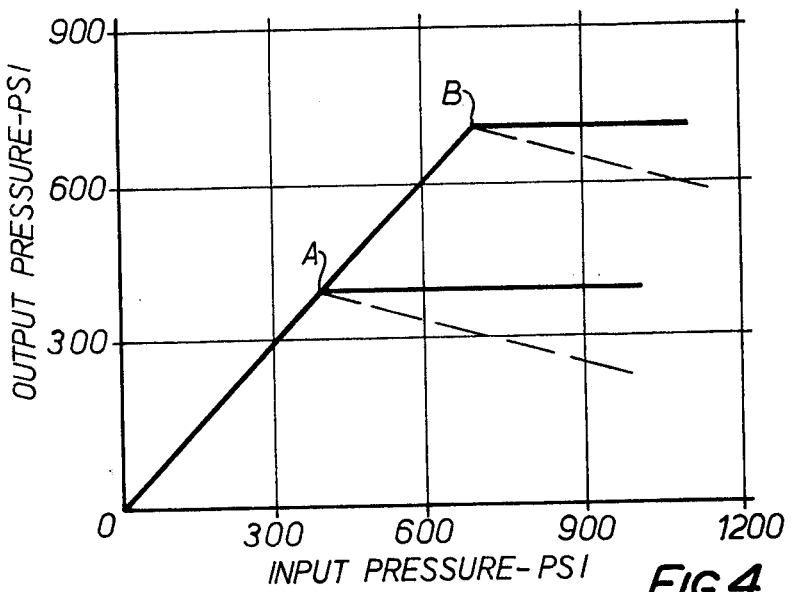
FIG. 4 is a curve of inlet pressure vs. outlet for the valve assembly of FIG. 3.

Operation of this control valve assembly is generally the same as that of FIG. 1 except that the valve 30 remains closed when the "cut-in" pressure is attained so that in a static condition of the vehicle the pressure curves for the laden and unladed conditions are as shown in full lines in FIG. 4. In the dynamic state the vehicle weight transfer which occurs during braking may cause downward movement of the arm 23 to reduce the load on the control piston 13, thereby permitting rightward movement of the piston resulting in expansion of the outlet chamber and a reduction in outlet pressure, as shown in broken lines in FIG. 4. This is particularly desirable for vehicles with high centres of gravity which have large weight transfer characteristics. By reducing the outlet pressure as described above the tendency for rear wheel brakes to lock under heavy braking and attendant large weight transfer is minimised.

It will be appreciated that many modifications of each of the above-described forms of valve assembly are possible. For example, the spring 18 could be stationary and act on the lever 17 through the intermediary of a roller, or the spring 18 may be replaced by a leaf spring having one end acting on the housing 9 and its other end on the lever 17.

Figure 5:
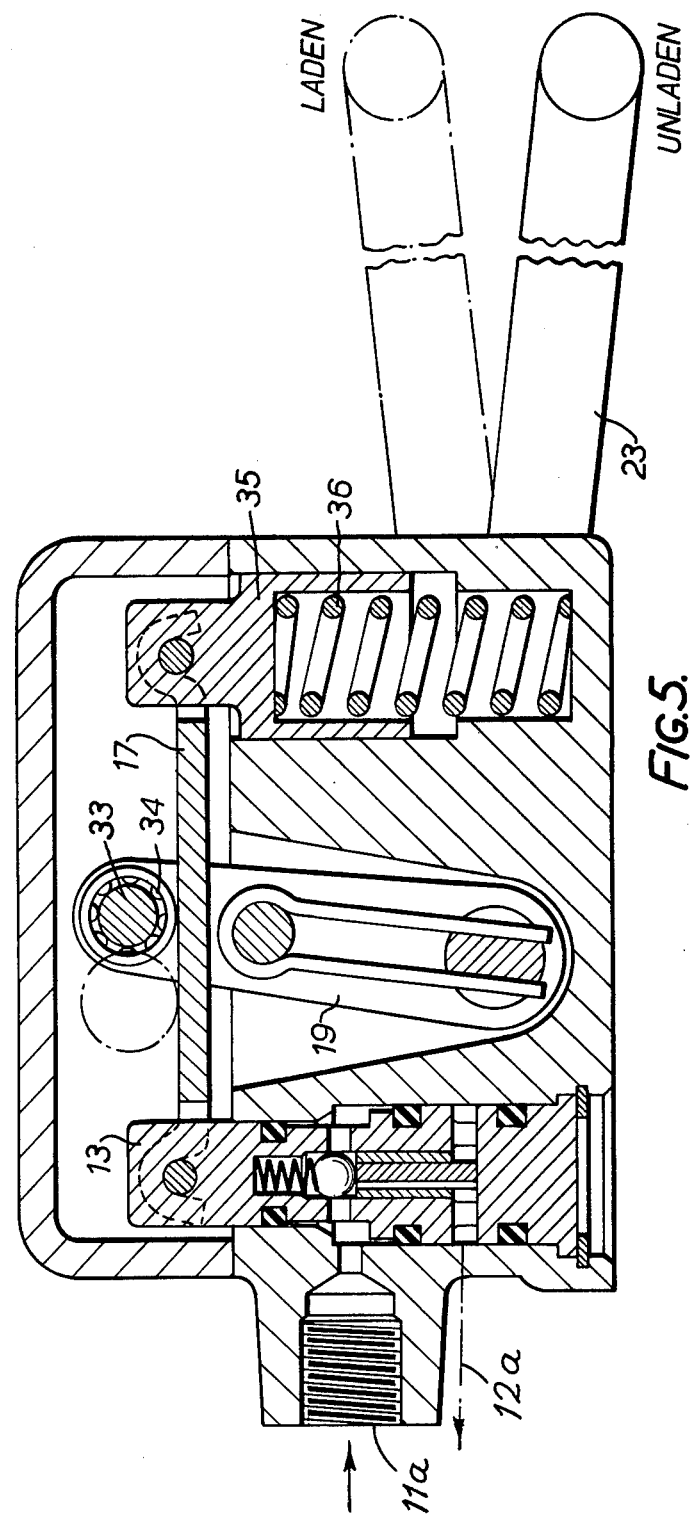
FIG. 5 is a cross-sectional view of another form of valve assembly.

In FIG. 5 there is illustrated a valve assembly having a modified arrangement for applying the pre-load to the control member. The valve is similar to that illustrated in FIG. 3, but with a stepped piston 13 so that the valve acts as a pressure reducing valve. A pressure limiting valve, such as illustrated in FIG. 3 could also be used.

In this assembly, the link 19 has a spigot 33 which supports a roller bearing 34 which engages the lever 17 intermediate its ends. One end of the lever 17 engages the control piston 13 and the other end engages a member 35 biased by a coil compression spring 36 which is equivalent to the spring 18 of the previously described valve assemblies.

Each of the above described valve assemblies has the advantages that the rate of the control spring 18,36 can be very low and is independent of the load on the vehicle; that the hysteresis of the valve is low so that the input/output pressure relationship is substantially the same on brake release and brake application; and that should the pre-loading arrangement brake or be damaged the valve will still act as a pressure limiting or reducing valve. In the assemblies illustrated in FIGS. 1 and 3 the spring 18 will tend to centralise the lever 17 between its extreme laden and unladen positions should be pre-loading arrangement fail.

It will be appreciated that the link 19 could be biased to its 'laden' position using a separate spring so that if the connection between the link and the axle fails the valve will operate as if the vehicle were fully laden, i.e. with its highest cut-in pressure.

I claim:

1. A control valve assembly for a vehicle braking system, comprising an inlet, an outlet, a control valve having a control valve operating member operable to control communication between said inlet and said outlet, and loading means for applying a load to the valve operating member, said loading means comprising a pivoted lever arrangement co-operating with said valve operating member, means applying an input force to said lever arrangement, and means for varying the lever ratio of said lever arrangement in dependence upon vehicle loading, wherein said means applying said input force is a resilient means, said input force being substantially constant and independent of vehicle loading, whereby variations in the lever ratio vary the load transmitted to said valve operating member.

2. A control valve assembly according to claim 1, wherein said resilient means is in the form of a spring.

3. A control valve assembly according to claim 1, wherein said resilient means acts at all times at the same point of the lever arrangement.

4. A control valve assembly according to claim 1, wherein said valve operating member is coupled to a fixed point on said lever arrangement.

5. A control valve assembly according to claim 1, wherein said lever arrangement comprises a movable fulcrum, and a lever which is restrained against longitudinal movement and engages said movable fulcrum.

6. A control valve assembly according to claim 5, including an input arm which is movable relative to the lever in dependence upon vehicle loading and is connected to said fulcrum.

7. A control valve assembly according to claim 6, including a housing in which said arm is pivotally mounted.

8. A control valve assembly according to claim 5, wherein said resilient means and said valve operating member are coupled to said lever on opposite sides of said fulcrum.

9. A control valve assembly for a vehicle braking system, comprising an inlet, an outlet, a control valve having a control valve operating member operable to control communication between said inlet and said outlet, and loading means for applying a load to the valve operating member, said loading means comprising a pivoted lever arrangement co-operating with said valve operating member, means applying an input force to said lever arrangement, and means for varying the lever ratio of said lever arrangement in dependence upon vehicle loading, wherein said means applying said input force is a resilient means, said input force being substantially constant and independent of vehicle loading, whereby variations in the lever ratio vary the load transmitted to said valve operating member, said lever arrangement comprising a fixed fulcrum, and a lever which is movable longitudinally relative to said fixed fulcrum to vary the lever ratio.

10. A control valve assembly according to claim 9, wherein said fulcrum is connected to said valve operating member.

11. A control valve assembly according to claim 9, including an input member which is movable in dependence upon vehicle loading and is connected to the lever to one side of said fulcrum and wherein said resilient means acts on the lever to one side of the fulcrum.

12. A control valve assembly according to claim 11, including a housing in which said input member is pivotally mounted, wherein said input member is pivotally connected to said lever whereby rotation of the member moves the lever rectilinearly.

13. A control valve assembly according to claim 9, wherein said fulcrum comprises a roller in abutting engagement with said lever.

* * * * *